US008983144B2

(12) United States Patent
Nakagomi et al.

(10) Patent No.: US 8,983,144 B2
(45) Date of Patent: *Mar. 17, 2015

(54) CONTENT EXTRACTING DEVICE, CONTENT EXTRACTING METHOD AND PROGRAM

(71) Applicant: Sony Corporation, Tokyo (JP)

(72) Inventors: Kazuhiro Nakagomi, Tokyo (JP); Yorimitsu Naito, Tokyo (JP); Takayuki Ochi, Tokyo (JP); Takamasa Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,172

(22) Filed: Aug. 26, 2014

(65) Prior Publication Data
US 2014/0363056 A1    Dec. 11, 2014

Related U.S. Application Data

(63) Continuation of application No. 13/486,459, filed on Jun. 1, 2012, now Pat. No. 8,885,892.

(30) Foreign Application Priority Data

Jun. 13, 2011 (JP) ................................ 2011-131129

(51) Int. Cl.
G06K 9/00 (2006.01)
G06Q 50/00 (2012.01)
G06F 17/30 (2006.01)

(52) U.S. Cl.
CPC .......... G06Q 50/01 (2013.01); G06F 17/30613 (2013.01)
USPC ....................................................... 382/115

(58) Field of Classification Search
None
See application file for complete search history.

(56) References Cited

U.S. PATENT DOCUMENTS

| 2009/0304289 | A1 | 12/2009 | Karimoto et al. |
| 2009/0318165 | A1 | 12/2009 | Shin |
| 2010/0030755 | A1 | 2/2010 | Kim |
| 2010/0076777 | A1 | 3/2010 | Paretti et al. |
| 2010/0079613 | A1 | 4/2010 | Karimoto et al. |
| 2010/0312714 | A1 | 12/2010 | Ourega |
| 2011/0025873 | A1 | 2/2011 | Wang et al. |

Primary Examiner — Stephen R Koziol
Assistant Examiner — Amandeep Saini
(74) Attorney, Agent, or Firm — Oblon, McClelland, Maier & Neustadt, L.L.P.

(57) ABSTRACT

An information processing apparatus that obtains intimacy degree information corresponding to identification information of a first person, specifies an extraction period based on the intimacy degree information, and extracts content in the extraction period.

18 Claims, 14 Drawing Sheets

FIG. 2

| IMAGE FILE | META DATA | | |
| --- | --- | --- | --- |
| | TITLE | SHOOTING TIME / DATE | ... |
| DSC101.jpg | aaaaa | 2011/6/1  14:26 | ... |
| DSC102.jpg | aaabb | 2011/6/1  14:27 | ... |
| DSC103.jpg | aabbb | 2011/6/1  14:30 | ... |
| DSC104.jpg | babbb | 2011/6/1  14:33 | ... |
| DSC105.jpg | bbabb | 2011/12/3  11:55 | ... |
| ⋮ | ⋮ | ⋮ | ⋮ |

FIG. 3

| FACE THUMBNAIL | EXTRACTION SOURCE CONTENT |
| --- | --- |
| 001.jpg | DSC101.jpg |
| 002.jpg | DSC102.jpg |
| 003.jpg | DSC103.jpg |
| 004.jpg | DSC101.jpg |
| 005.jpg | DSC105.jpg |
| ⋮ | ⋮ |

FIG. 4

| PERSON ID | FACE THUMBNAIL | EXTRACTION SOURCE CONTENT | SMILE DEGREE | FACE ORIENTATION |
|---|---|---|---|---|
| ID001 | 001.jpg | DSC101.jpg | 50 | left |
| | 002.jpg | DSC102.jpg | 10 | center |
| | 003.jpg | DSC103.jpg | 30 | right |
| ID002 | 004.jpg | DSC101.jpg | 70 | up |
| | 005.jpg | DSC105.jpg | 100 | center |
| ⋮ | ⋮ | ⋮ | ⋮ | ⋮ |

FIG. 6

| PERSON ID | TARGET PERSON ID | INTIMACY DEGREE | START TIME/DATE | END TIME/DATE |
|---|---|---|---|---|
| ID001 | ID002 | 40 | 2011/1/1 | 2011/2/3 |
| | | 60 | 2011/2/4 | 2011/3/31 |
| | ID003 | 80 | 2005 | 2008 |
| | | 50 | 2009 | 2010 |
| | ID004 | 40 | 2000 | - |
| ID002 | ID001 | 50 | 2011/1/1 | 2011/2/3 |
| | | 70 | 2011/2/4 | 2011/3/31 |
| | ID003 | 70 | 1999/3/1 | 2011/3/31 |
| ⋮ | ⋮ | ⋮ | ⋮ | ⋮ |

FIG. 8

| CATEGORY | ADD INTIMACY DEGREE | RELATIONSHIP |
|---|---|---|
| Spouse | HIGH | SPOUSE |
| Child | HIGH | CHILD |
| Parent | MIDDLE | PARENT |
| Sibling | MIDDLE | SIBLING |
| Couple | MIDDLE | LOVER |
| Friend | MIDDLE | FRIEND |
| Contact | LOW | ACQUAINTANCE |
| Relative | LOW | RELATIVE |
| Other | NONE | OTHER |

FIG. 11

| EVENT ID | START TIME/DATE | END TIME/DATE | CONTENT | PARTICIPANT |
|---|---|---|---|---|
| Event001 | 2010/3/1 | 2010/3/2 | DSC101.jpg | ID001 ID002 |
| | | | DSC102.jpg | |
| | | | DSC103.jpg | |
| Event002 | 2011/1/2 13:30 | 2011/1/3 17:00 | DSC104.jpg | ID001 |
| | | | DSC105.jpg | |
| ⋮ | ⋮ | ⋮ | ⋮ | ⋮ |

FIG. 12

| EVENT ID | PARTICIPANT | IMPORTANCE DEGREE |
|---|---|---|
| Event001 | ID001 | 80 |
| | ID002 | 50 |
| Event002 | ID001 | 60 |
| ⋮ | ⋮ | ⋮ |

FIG. 14

| CATEGORY | ADD IMPORTANCE DEGREE | TIME/DATE |
|---|---|---|
| Ceremonial | HIGH | BIRTHDAY, WEDDING ANNIVERSARY |
| Holiday | MIDDLE | SUMMER HOLIDAYS, WINTER HOLIDAYS, SPRING HOLIDAYS, GW |
| Weekend | LOW | WEEKEND |
| Weekday | NONE | WEEKDAY |

FIG. 15

| CATEGORY | ADD IMPORTANCE DEGREE | LOCATION |
|---|---|---|
| Ceremonial | HIGH | PLACE FOR WEDDING |
| Sightseeing | MIDDLE | SIGHTSEEING SPOT |
| Neighborhood | LOW | PARK, NEIGHBORHOOD |

FIG. 16

| category | ADD IMPORTANCE DEGREE | Album keyword |
|---|---|---|
| Ceremonial | HIGH | BIRTH, CEREMONIAL PHOTOGRAPH, KINDERGARTEN'S ENTRANCE CEREMONY, KINDERGARTEN'S GRADUATION CEREMONY, ENTRANCE CEREMONY, GRADUATION CEREMONY, COMPLETION CEREMONY, WEDDING CEREMONY, MARRIAGE, MARRIAGE'S REGISTRATION, EXCHANGE OF BETROTHAL GIFTS, SHICHI-GO-SAN FESTIVAL, SEASONAL FESTIVAL |
| Anniversary | MIDDLE | ANNIVERSARY, BIRTHDAY |
| Trip | MIDDLE | TRAVEL, SIGHTSEEING, TOURING, HOT SPRING, SKI, HOTEL |
| Festival | MIDDLE | CHRISTMAS, NEW YEAR'S HOLIDAYS, CHILDREN'S DAY, NEW YEAR'S EVE, ATHLETIC FESTIVAL, SCHOOL FESTIVAL, FESTIVAL, CHERRY BLOSSOM VIEWING, EVENT |
| Place | MIDDLE TO LOW | KARUIZAWA, MANZA, NARA, KYOTO, UMIHOTARU, IZU, KAMAKURA, ITALY, FRANCE |
| Park | MIDDLE TO LOW | TOKYO DISNEYLAND, TOKYO DISNEYSEA, USJ, SAFARI, ZOO, MUSEUM, ZOORASIA, ART MUSEUM, GALLERY, PUROLAND, DOME |
| Living | LOW | EVERYDAY, HOSPITAL STAY, BBQ, HOME, HOSPITAL DISCHARGE, MOVE, NEW YEAR'S FIRST VISIT TO SHRINE, FRIEND'S WEDDING, NEW YEAR'S PARTY, DRINKING PARTY, WELCOME PARTY, FAREWELL PARTY, BROILED MEAT PARTY |
| Hobby | LOW | BIKE, GAME, CAR |

CONTENT EXTRACTING DEVICE, CONTENT EXTRACTING METHOD AND PROGRAM

CROSS REFERENCE TO RELATED APPLICATION

This application is a continuation of and is based upon and claims the benefit of priority under 35 U.S.C. §120 for U.S. Ser. No. 13/486,459, filed Jun. 1, 2012, and claims the benefit of priority under 35 U.S.C. §119 to Japanese Priority Patent Application JP 2011-131129 filed in the Japan Patent Office on Jun. 13, 2011, the entire contents of each of which are hereby incorporated by reference.

BACKGROUND

The present disclosure relates to a content extracting device, a content extracting method and a program.

In recent years, the number of digital contents owned by a user has increased along with wide use of digital cameras and a higher capacity of a memory storing digital data therein. A user has confirmed and selected each content in order to extract and reproduce a desired content.

On the other hand, there has been proposed a method for automatically extracting a content based on a content analysis result. For example, Japanese Patent Application Laid-Open No. 2006-81021 proposes therein an electronic album displaying system capable of calculating an intimacy degree of objects on an album basis and extracting a photograph when an intimacy degree with a designated object is equal to or more than a predetermined threshold, assuming that a smaller number of objects in one photograph have a higher intimacy degree of the objects.

SUMMARY

However, an importance degree for content is different per user viewing the content. Thus, there is demanded a technique capable of extracting a content having a high importance degree for the user. Thus, the present disclosure proposes a novel and improved content extracting device, content extracting method and program capable of extracting a content having a high importance degree for a designated user.

An information processing apparatus that obtains intimacy degree information corresponding to identification information of a first person, specifies an extraction period based on the intimacy degree information, and extracts content in the extraction period.

An information processing method performed by an information processing apparatus, the method comprising: obtaining, by a processor of the information processing apparatus, intimacy degree information corresponding to identification information of a person; specifying, by the processor, an extraction period based on the intimacy degree information; and extracting, by the processor, content in the extraction period.

A non-transitory computer-readable medium including computer program code, which when executed by an information processing apparatus, causes the information processing apparatus to perform a method comprising: obtaining intimacy degree information corresponding to identification information of a person; specifying an extraction period based on the intimacy degree information; and extracting content in the extraction period.

According to the present disclosure described above, it is possible to extract a content having a high importance degree for a user.

BRIEF DESCRIPTION OF THE DRAWINGS

FIG. 2 is an explanation diagram showing exemplary content information used in the first embodiment;

FIG. 3 is an explanation diagram showing exemplary face thumbnail information extracted from a content according to the first embodiment;

FIG. 4 is an explanation diagram showing exemplary person information used in the first embodiment;

FIG. 6 is a table showing exemplary intimacy degree information used in the first embodiment;

FIG. 8 shows an exemplary intimacy degree conversion table used in the first embodiment;

FIG. 11 is a table showing exemplary event information used in the second embodiment;

FIG. 12 is a table showing exemplary event importance degree information used in the second embodiment;

FIG. 14 shows an exemplary event importance degree conversion table used in the second embodiment;

FIG. 15 shows another exemplary event importance degree conversion table used in the second embodiment;

FIG. 16 shows still another exemplary event importance degree conversion table used in the second embodiment.

DETAILED DESCRIPTION OF THE EMBODIMENTS

Figure 1:
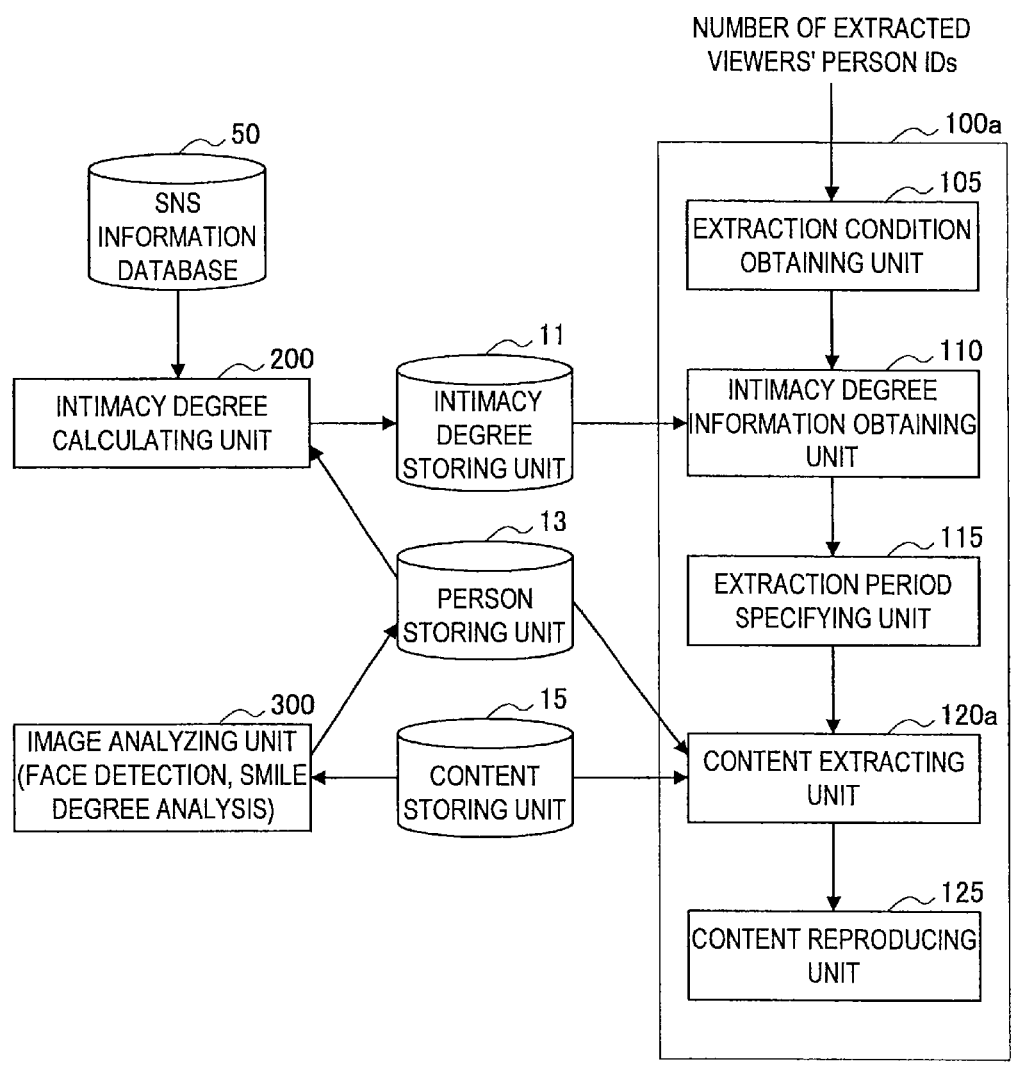
FIG. 1 is a structural diagram of a content extracting system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
1. First embodiment (example of extracting content based on intimacy degree)
  1-1. Structure
  1-2. Exemplary intimacy degree calculation
  1-3. Exemplary content extracting operation
2. Second embodiment (example of extracting content based on event importance degree)
  2-1. Structure
  2-2. Exemplary event importance degree calculation
  2-3. Exemplary content extracting operation

1. First Embodiment

1-1. Structure

Figure 5:
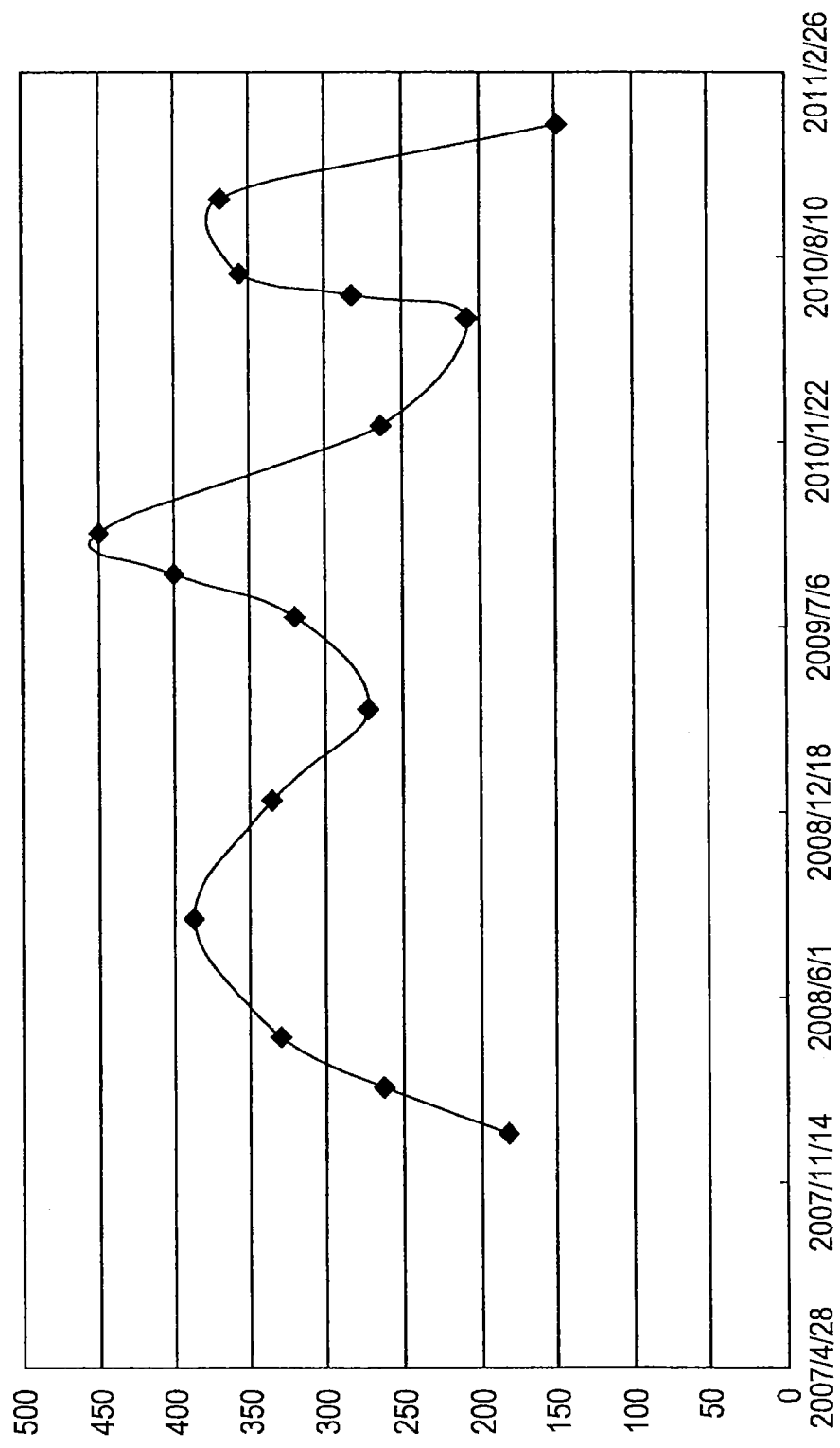
FIG. 5 is an explanation diagram showing an exemplary transition of an intimacy degree used in the first embodiment.
Figure 7:
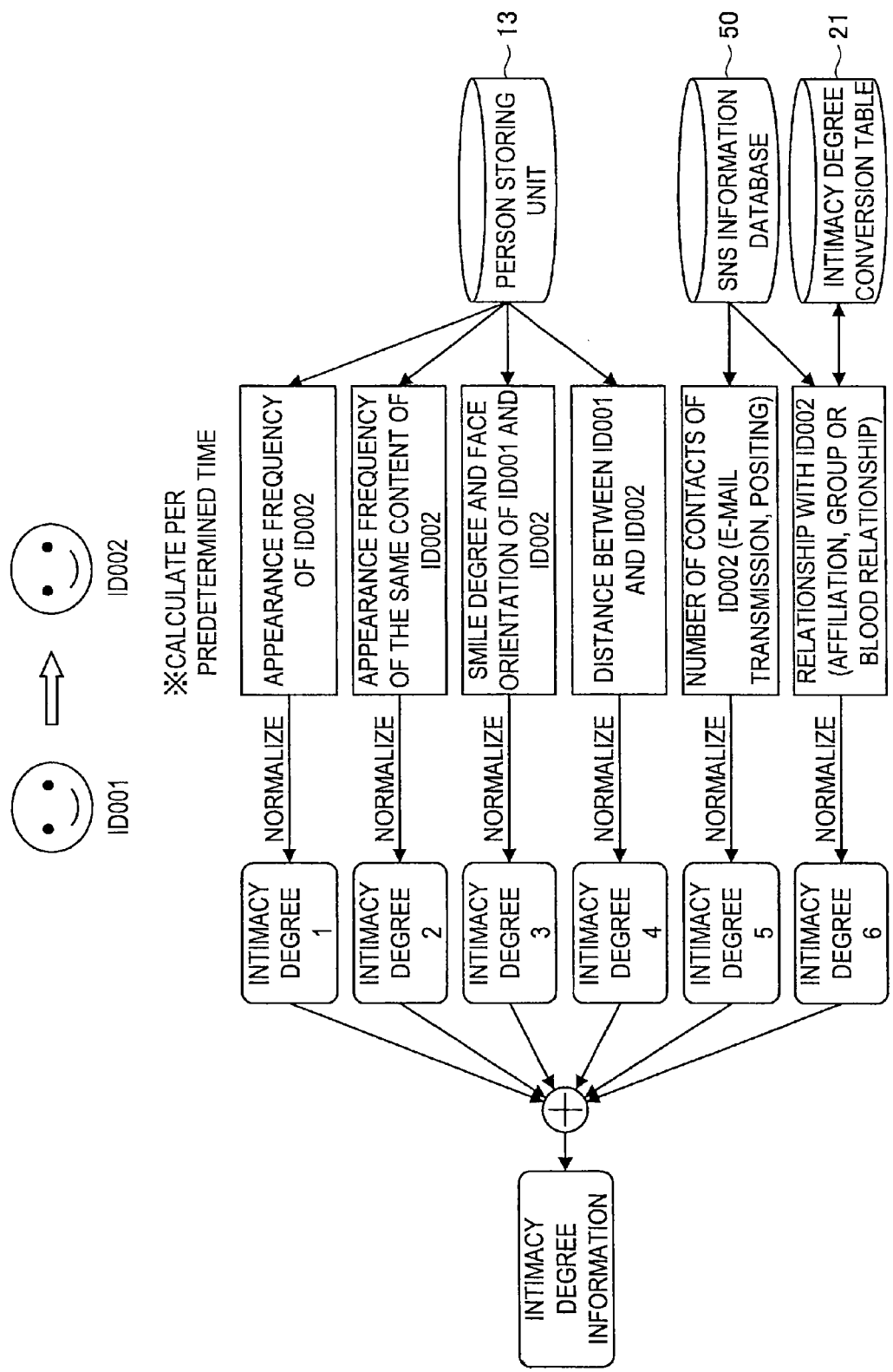
FIG. 7 is an explanation diagram schematically showing an exemplary calculation of the intimacy degree information used in the first embodiment.

A structure of a content extracting system 10 according to a first embodiment of the present disclosure will be first described with reference to FIGS. 1 to 8. FIG. 1 is a structural diagram of the content extracting system according to the first embodiment of the present disclosure. FIG. 2 is an explanatory diagram showing exemplary content information used in the first embodiment. FIG. 3 is an explanatory diagram showing exemplary face thumbnail information extracted from a content according to the first embodiment. FIG. 4 is an explanatory diagram showing exemplary person information used in the first embodiment. FIG. 5 is an explanatory diagram showing an exemplary transition of an intimacy degree used in the first embodiment. FIG. 6 is a table showing exemplary intimacy degree information used in the first embodiment. FIG. 7 is an explanatory diagram schematically showing an exemplary calculation of the intimacy degree information used in the first embodiment. FIG. 8 shows an exemplary intimacy degree conversion table used in the first embodiment.

The content extracting system 10 according to the present embodiment mainly includes a content extracting device 100a, an intimacy degree calculating unit 200, an image analyzing unit 300, an intimacy degree storing unit 11, a person storing unit 13, a content storing unit 15 and a SNS information database 50. The SNS is an abbreviation of Social Network Service, and means a service for constructing a social network over the Internet.

The functions of the content extracting device 100a, the intimacy degree calculating unit 200, the image analyzing unit 300, the intimacy degree storing unit 11, the person storing unit 13, the content storing unit 15 and the SNS information database 50 may be mounted on any hardware for enabling information to be exchanged via a network. A processing implemented by one function unit may be achieved by single hardware or may be achieved by multiple hardware in a distributed manner.

Generation of person information and an intimacy degree used for extracting a content by the content extracting device 100a will be described herein. The person information generated by the image analyzing unit 300 from content information stored in the content storing unit 15 will be first described.

(Generation of Person Information)

The content storing unit 15 stores content information as shown in FIG. 2 therein, for example. The content storing unit 15 is a data storing device, and may be online storage, a hard disc drive of a local personal computer (PC), a file server or a removable memory, for example. The content information may be an image file added with metadata, for example. The image analyzing unit 300 analyzes the content information to generate person information. For example, the image analyzing unit 300 first uses a face detecting technique thereby to extract a face area in an image. The image analyzing unit 300 may output the position of each object's face detected from an image to be processed as an XY coordinate value in the image, for example. The image analyzing unit 300 may output a size (width and height) of the detected face and a posture of the detected face. The face area extracted by the image analyzing unit 300 may be stored as an additional thumbnail image file in which only the face area is cut out, for example. For example, FIG. 3 shows exemplary face thumbnail image information in which the extracted face area is stored as an additional thumbnail file.

The image analyzing unit 300 may analyze the extracted face thumbnail image thereby to extract attribute information of each face thumbnail image. The attribute information may include smile degree, sex and age, for example. The image analyzing unit 300 may collect the persons who seem the same in one person ID. At this time, the image analyzing unit 300 may use a face clustering technique. For example, the image analyzing unit 300 may analyze a similarity of multiple face thumbnail images thereby to consolidate the persons who seem to be the same with single person ID.

The person information generated by the above processings may be stored in the person storing unit 13. The person storing unit 13 may be a database using relational database (RDB), for example. Alternatively, the person storing unit 13 may be a file system. FIG. 4 shows exemplary person information stored in the person storing unit 13. The person information may include information such as person ID, face thumbnail, extraction source content, smile degree and face orientation. Though not shown, the person information may include attribute information (such as sex and age) other than smile degree and face orientation. The smile degree used here is indicated by a number between 0 and 100, for example, and a larger number indicates a higher degree of smile.

(Exemplary Intimacy Degree Calculation)

An exemplary intimacy degree calculation by the intimacy degree calculating unit 200 will be described below. The intimacy degree calculating unit 200 may calculate an intimacy degree based on the person information stored in the person storing unit 13 and the SNS information stored in the SNS information database 50.

SNS is a community member service for supporting a relationship between persons, for example. Typical SNS is a service to provide a place where a user registers his/her own profile and communicates other users having a common relationship. In the present embodiment, SNS may include a blog service having a communication function (such as comment posting, e-mail transmission) with other users. The blog service may include a mini-blog service for posting a text with a limited number of characters. Alternatively, the SNS according to the present embodiment may include a community service using videos such as photographs and animations as a main communication tool.

The intimacy degree calculating unit 200 may use published Web Application Program Interface (API) of the SNS thereby to obtain SNS information of SNS users. The SNS information obtainable by the intimacy degree calculating unit 200 is different depending on a SNS specification or user's disclosure setting. For example, the SNS information may be classified into fact-based registration information which the user registers in SNS (such as name, date of birth, family structure and friend information) and usage history information generated by the use of the SNS (such as contact history with other users and e-mail transmission history).

The intimacy degree calculating unit 200 may calculate an intimacy degree between persons based on the person information stored in the person storing unit 13. The intimacy degree calculating unit 200 may further use the SNS information to calculate an intimacy degree. In recent years, a community service such as SNS has appeared over Internet, and thus a form of communication made without seeing in face has been established. Thereby, if the user is communicating on SNS with a person whom the user has not met for a long time, the user may feel so intimate. The intimacy degree calculating unit 200 may use the SNS information to calculate an intimacy degree based on such communication over Internet.

The intimacy degree calculating unit 200 may calculate an intimacy degree between persons. For example, an intimacy degree of a person ID002 for a person ID001 may have a different value from an intimacy degree of the person ID001 for the person ID002. A larger value indicates a higher intimacy degree. The intimacy degree changes over time as indicated in the graph of FIG. 5, for example. Thus, the intimacy degree is stored in the intimacy degree storing unit 11 in association with a calculation period. The intimacy degree calculating unit 200 may calculate an intimacy degree per time cluster collected by time clustering, for example. Alternatively, the intimacy degree calculating unit 200 may calculate an intimacy degree per predetermined period (such as per year).

The intimacy degree storing unit 11 may be a database using RDB, for example. Alternatively, the intimacy degree storing unit 11 may be a file system. FIG. 6 shows exemplary intimacy degree information stored in the intimacy degree storing unit 11. The intimacy degree information is associated with person ID, target person ID, intimacy degree, start time/date and end time/date, for example. With reference to the intimacy degree information of FIG. 6, the intimacy degree of ID002 for the person ID001 is found to be 40 from Jan. 1, 2011 to Feb. 3, 2011, and is found to be 60 from Feb. 4, 2011 to Mar. 31, 2011.

The exemplary intimacy degree calculation will be specifically described with reference to FIGS. 7 and 8. An example in which the intimacy degree of the person ID002 viewed from the person ID001 is calculated will be described herein. Herein, intimacy degrees calculated from six aspects and normalized values are added to be the intimacy degree between the person ID001 and the person ID002. The intimacy degree is calculated per predetermined period.

For example, the intimacy degree calculating unit 200 may use the person information stored in the person storing unit 13 to assume a value obtained by normalizing an appearance frequency of the person ID002 in the image as intimacy degree 1. When a plurality of persons are present in the same location, the higher the intimacy degree between persons is, the more the persons are likely to be viewed as objects of a content such as photograph or animation. Therefore, the intimacy degree 1 may be larger when the ratio of the person ID002 appearing among total contents shot in a predetermined calculation period as an object is higher The intimacy degree calculating unit 200 may use the person information stored in the person storing unit 13 to assume a value obtained by normalizing an appearance frequency of the person ID001 and the person ID002 in the same content as intimacy degree 2. When a plurality of persons are present in the same location, the higher the intimacy degree between persons is, the more the persons are likely to be viewed together in a photograph or animation. Therefore, the intimacy degree 2 may be larger when the ratio that the person ID001 and the person ID002 are contained as objects in the same content among total contents shot in a predetermined intimacy degree calculation period is higher, for example.

The intimacy degree calculating unit 200 may use the person information stored in the person storing unit 13 to calculate intimacy degree 3 based on the smile degree and the face orientation of the person ID001 and the person ID002. The higher the intimacy degree between the person ID001 and the person ID002 is, the higher the smile degree is assumed when the two are together. Therefore, the intimacy degree 3 may be larger as the smile degree of the person ID001 and the person ID002 is higher. The higher the intimacy degree between the person ID001 and the person ID002 is, the more the two persons are assumed to face each other when they are together. Thus, the intimacy degree 3 may be larger as the person ID001 and the person ID002 are highly likely to face each other.

The intimacy degree calculating unit 200 may use the person information stored in the person storing unit 13 to calculate intimacy degree 4 based on a distance between the person ID001 and the person ID002 in the image. A person has his/her own personal space. The personal space is a physical distance to a communicating party. The distance is individually different, and is near as the relationship with the party is closer, that is as the intimacy degree is larger. Therefore, the intimacy degree 4 may be larger as the physical distance between the person ID001 and the person ID002 in the image is shorter.

The intimacy degree calculating unit 200 may use the SNS information stored in the SNS information database 50 to calculate intimacy degree 5 based on the number of contacts made in a predetermined period between the person ID001 and the person ID002 on the SNS. For example, the number of contacts may be a total value of the number of e-mail exchanged between the person ID001 and the person ID002 and the number of postings from the person ID001 to the person ID002.

The intimacy degree calculating unit 200 may calculate intimacy degree 6 based on a relationship between the person ID001 and the person ID002. The intimacy degree 6 may be calculated by using the SNS information stored in the SNS information database 50, for example. For example, the intimacy degree calculating unit 200 may extract a relationship between the person ID001 and the person ID002 from the SNS registration information. For example, when there is obtained information indicating that the person ID001 and the person ID002 are spouses, the intimacy degree calculating unit 200 may then refer to an intimacy degree conversion table 21. FIG. 8 shows an exemplary intimacy degree conversion table 21, for example. The intimacy degree conversion table 21 indicates a relationship between persons and a correspondence with an intimacy degree addition rate, for example. When the person ID001 and the person ID002 are spouses as described above, the intimacy degree addition rate is high according to the intimacy degree conversion table 21. Herein, the intimacy degree addition rate is indicated with high, middle and low, but may be indicated by a specific numerical value. The intimacy degree calculating unit 200 may increase the value of the intimacy degree 6 based on the intimacy degree addition rate as the intimacy degree addition is larger.

The intimacy degree calculating unit 200 may then generate intimacy degree information by adding the normalized intimacy degree 1 to intimacy degree 6. The intimacy degree calculating unit 200 may weight and add the values of the intimacy degree 1 to the intimacy degree 6.

The person information and the intimacy degree information used in the present embodiment have been described above. The person information generating method and the intimacy degree calculating method described above are exemplary and the present technique is not limited thereto. The person information and the intimacy degree information may be generated by other various methods. Turning to FIG. 1 again, the structure of the content extracting system 10 will be described further.

The content extracting device 100a is an exemplary information processing device having a function of extracting a content in association with a user from a plurality of contents. The extracted content may be an image content including a still image and animation, for example. The content extracting device 100a may transmit the extracted content to a user terminal device, thereby providing the content to the user. Alternatively, the content extracting device 100a may update access restriction information on the extracted content and publish the extracted content to the designated user thereby to provide the content so that the user may view the extracted content.

The content extracting device 100a mainly includes an extraction condition obtaining unit 105, an intimacy degree information obtaining unit 110, an extraction period specifying unit 115, a content extracting unit 120a and a content reproducing unit 125.

The extraction condition obtaining unit 105 has a function of obtaining a condition for extracting a content. The extraction condition may include a person ID of a designated user, for example. The extraction condition may also include the number of contents to be extracted. For example, the user may be input via an operation screen. For example, the extraction condition obtaining unit 105 may display a person included in a user's content with a thumbnail image or name, and provide a selection screen for selecting a person. The extraction condition obtaining unit 105 may assume the person ID of a person selected on the selection screen as a person ID of a user designated as content-viewing user. The designated user may be specified by analyzing the image. For example, a person viewing the screen on which the extracted content is being provided analyzes the shown image and specifies a user, and may assume the specified user as a designated user. The extraction condition obtaining unit 105 may supply the obtained extraction condition to the intimacy degree information obtaining unit 110.

The intimacy degree information obtaining unit 110 has a function of obtaining intimacy degree information of the user based on the person ID of the designated user contained in the content extraction condition obtained by the extraction condition obtaining unit 105. The intimacy degree information obtaining unit 110 may supply the obtained intimacy degree information to the extraction period specifying unit 115. The intimacy degree information obtained herein may be calculated based on the analysis result of multiple contents as stated above. The intimacy degree information may be calculated based on the SNS registration information of the designated user. The intimacy degree information may be calculated based on information on the SNS usage history of the designated user. At this time, the information on the SNS usage history may be the number of contacts made between designated users on SNS.

The extraction period specifying unit 115 has a function of specifying an extraction period based on the intimacy degree information supplied from the intimacy degree information obtaining unit 110. The extraction period specifying unit 115 may assume a period in which the intimacy degree between designated users is high as an extraction period. The extraction period specifying unit 115 may supply the information on the specified extraction period and the intimacy degree information supplied from the intimacy degree information obtaining unit 110 to the content extracting unit 120a.

The content extracting unit 120a has a function of extracting a content in the extraction period specified by the extraction period specifying unit 115. Therefore, the content extracting unit 120a may extract the content in the period in which the intimacy degree between designated users is high. The content extracting unit 120a may specify a third party who has commonly high intimacy degree from the supplied intimacy degree information among the designated users, and may preferentially extract a content including the third party. With the structure, there is extracted the content which is in the period in which the intimacy degree between the designated users is high and which includes a person who has commonly high intimacy degree among the designated users. Therefore, a content in which a content-viewer is more interested is automatically extracted. The content extracting unit 120a may extract and output the extracted content, for example. Alternatively, the content extracting unit 120a may output a list of extracted contents, for example.

The content reproducing unit 125 may reproduce the content extracted by the content extracting unit 120a based on the intimacy degree information of the designated users. For example, the content reproducing unit 125 may use an effect based on the intimacy degree information of the designated users to reproduce the content. For example, the content reproducing unit 125 may reproduce the content by panning or zooming the person having a high intimacy degree. For example, when a group photograph is reproduced, the photograph is preferably reproduced while being subjected to the effect such that the faces of a designated user and persons having a high intimacy degree with the designated user are apparently shown. The content reproducing unit 125 is described as part of the content extracting device 100a but the present technique is not limited thereto. For example, the content reproducing unit 125 may be separated from the content extracting device 100a.

The exemplary functions of the content extracting device 100a, the intimacy degree calculating unit 200 and the image analyzing unit 300 according to the present embodiment have been described above. Each component described above may be configured with a general-purpose member or circuit and may be configured in hardware specific to the function of each component. The function of each component may be implemented by reading a control program from a storage medium such as read only memory (ROM) or random access memory (RAM) which stores therein the control program describing a processing procedure of a computing device such as central processing unit (CPU) for realizing the function, and interpreting and executing the program. Thus, the structure to be utilized may be changed as necessary depending on a technical level at which the present embodiment is to be performed.

It is possible to create a computer program for realizing the functions of the content extracting device 100a, the intimacy degree calculating unit 200 and the image analyzing unit 300 according to the present embodiment as described above and to mount it on a personal computer or the like. It is further possible to provide a computer-readable recording medium storing the computer program therein. The recording medium is a magnetic disc, optical disc, magnetooptical disc, flash memory or the like, for example. The computer program may be distributed via a network, for example, not via a recording medium.

1-2. Exemplary Content Extracting Operation

Figure 9:
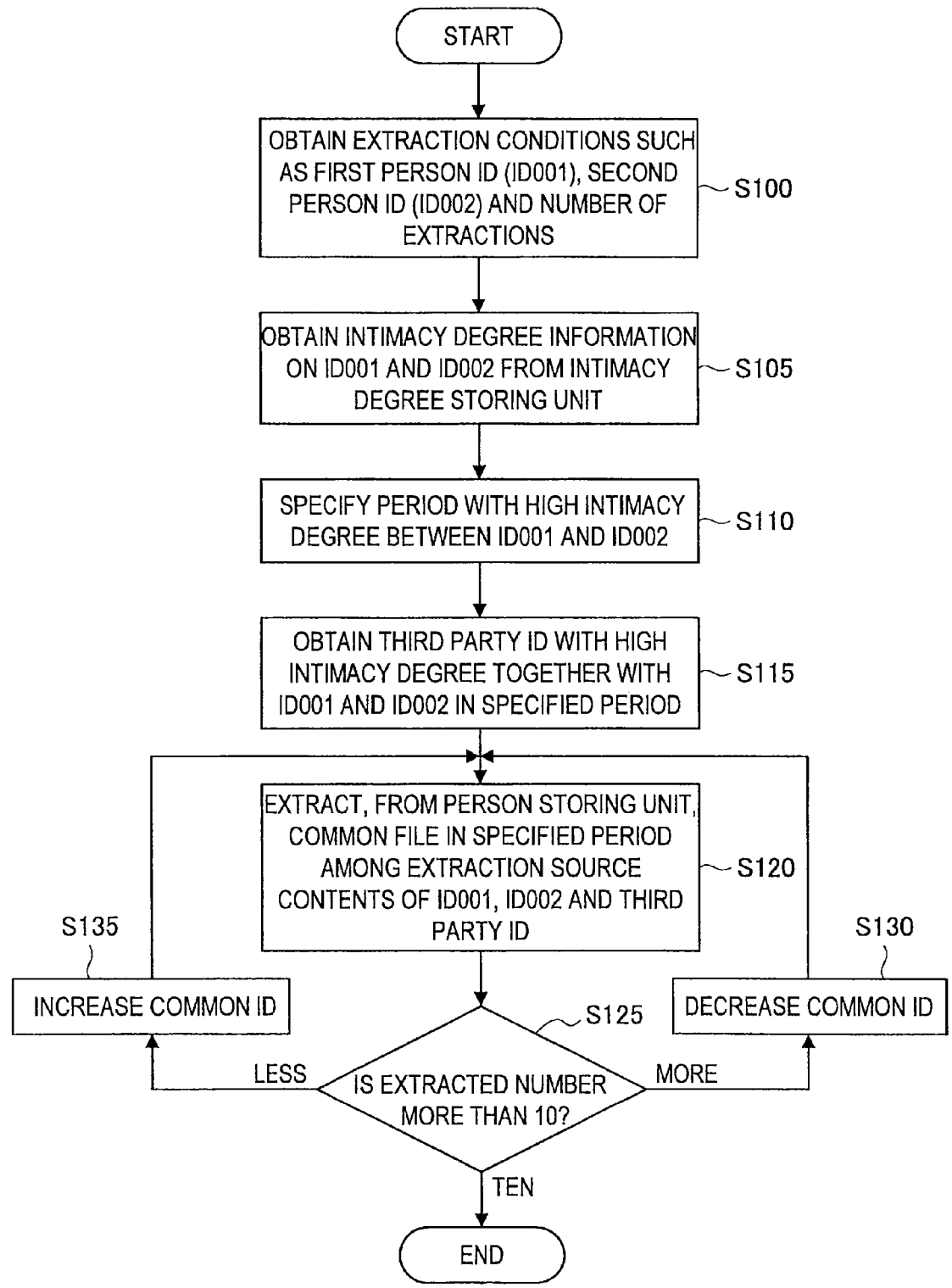
FIG. 9 is a flowchart showing an exemplary content extracting operation according to the first embodiment.

An exemplary content extracting operation according to the first embodiment of the present disclosure will be described below with reference to FIG. 9. FIG. 9 is a flowchart showing an exemplary content extracting operation according to the first embodiment.

In the content extracting device 100a, the extraction condition obtaining unit 105 first obtains an extraction condition (S100). The extraction condition may contain person IDs of designated users and the number of extractions. In the present embodiment, the user IDs of the designated persons are ID001 and ID002.

The intimacy degree information obtaining unit 110 then obtains intimacy degree information of the person ID001 and the person ID002 from the intimacy degree storing unit 11 (S105). The extraction period specifying unit 115 specifies a period in which the intimacy degree between the person ID001 and the person ID002 is high as an extraction period (S110).

The content extracting unit 120a then obtains the person ID of a third party who is common between the person ID001 and the person ID002 and has a high intimacy degree in the specified period (S115). Then, the content extracting unit 120a may extract a content in the specified extraction period from the common contents which are extraction source contents of the person IDs of the person ID001, the person ID002 and the person extracted as the third party from the person storing unit 13 (S120).

The content extracting unit 120a counts the number of extracted contents and compares the number of extracted contents with the designated number of extractions of 10 (S125). Then, when the number of extracted contents reaches the designated number of extractions of 10, the processing terminates.

On the other hand, when the number of extracted contents is more than the number of extractions, the content extracting unit 120a decreases the common IDs of the third parties who have commonly high intimacy degree among the designated users (S130). For example, the content extracting unit 120a may decrease the common IDs by deleting the third party IDs having the lowest intimacy degree among the extracted third parties from the common IDs.

When the number of extracted contents is less than the number of extractions, the content extracting unit 120a increases the common IDs of the third parties who have commonly high intimacy degree among the designated users (S130). For example, the content extracting unit 120a may increase the common IDs by lowering a threshold of the intimacy degree used for extracting a third party.

The exemplary content extracting operation has been described above. The content extracting unit 120a has been described herein as extracting a designated number of contents, but the present technique is not limited thereto. For example, when the number of extracted contents is not designated as an extraction condition, all the contents extracted based on the intimacy degree may be extracted.

2. Second Embodiment 2-1. Structure

Figure 10:
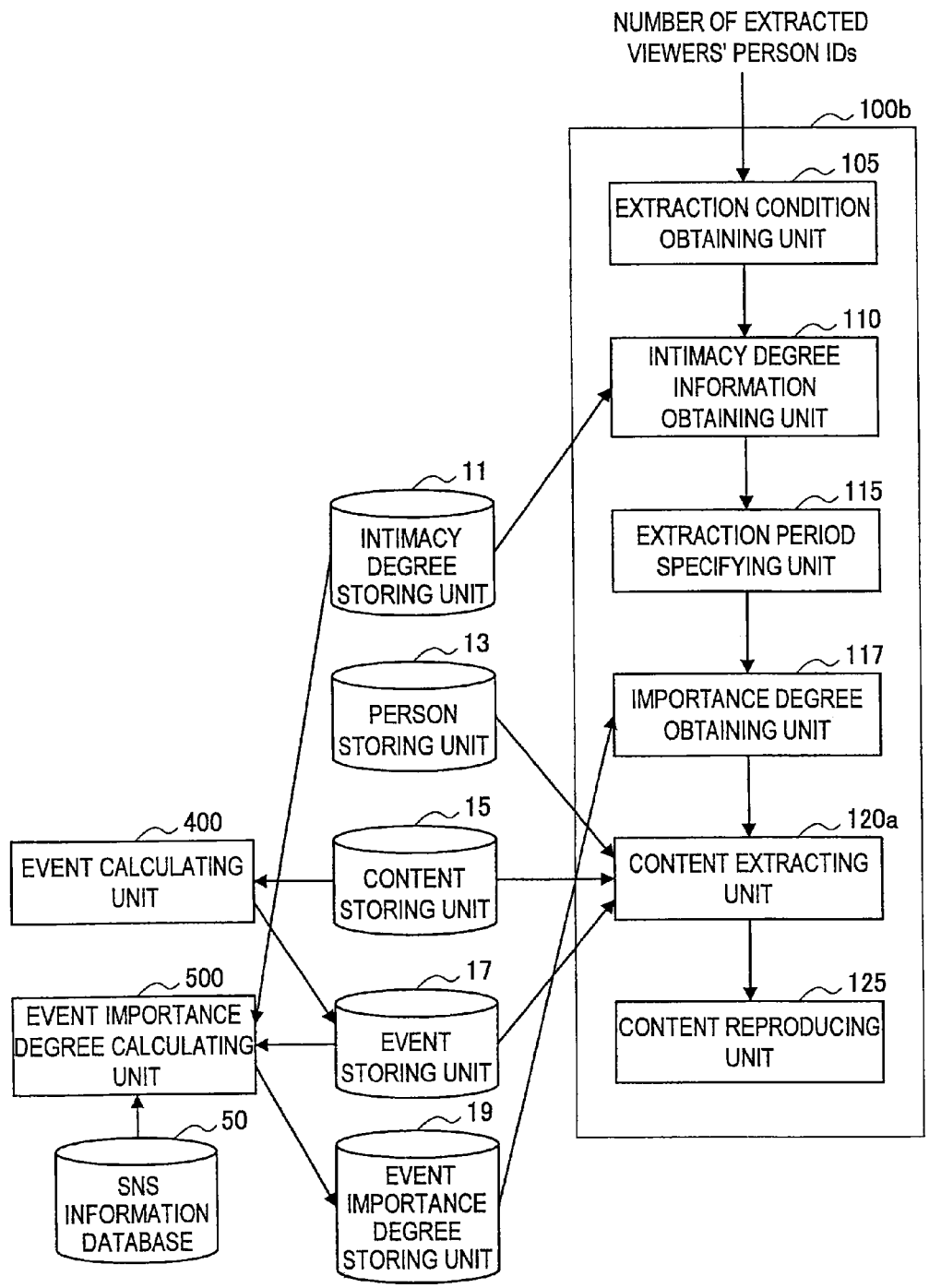
FIG. 10 is a structural diagram of a content extracting system according to a second embodiment of the present disclosure.
Figure 13:
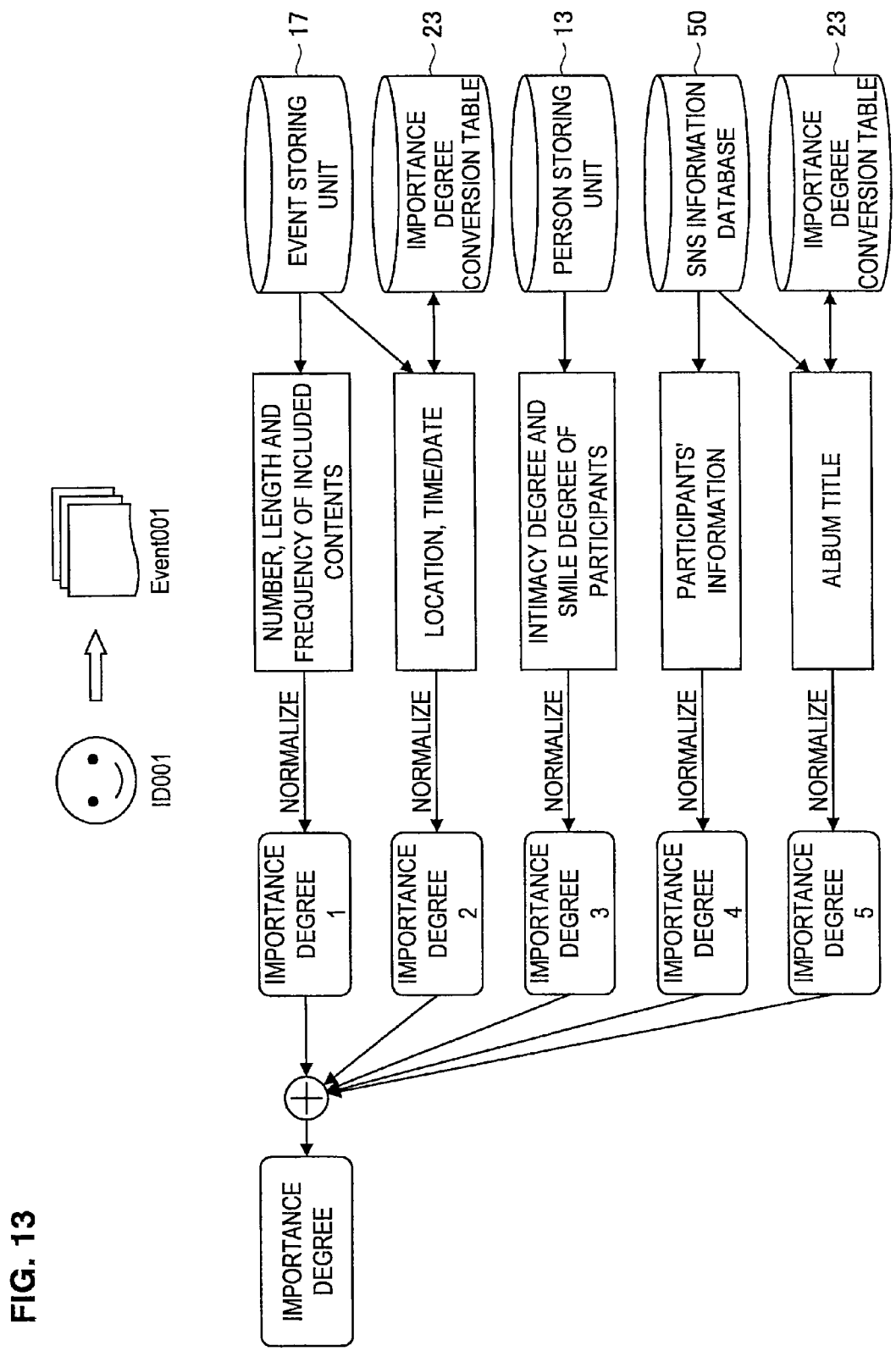
FIG. 13 is an explanatory diagram schematically showing an exemplary calculation of an event importance degree used in the second embodiment.

A structure of a content extracting system 20 according to a second embodiment of the present disclosure will be described below with reference to FIGS. 10 to 16. FIG. 10 is a structural diagram of the content extracting system according to the second embodiment of the present disclosure. FIG. 11 is a table showing exemplary event information used in the second embodiment. FIG. 12 is a table showing exemplary event importance degree information used in the second embodiment. FIG. 13 is an explanatory diagram schematically showing an exemplary event importance degree calculation used in the second embodiment. FIG. 14 shows an exemplary event importance degree conversion table used in the second embodiment. FIG. 15 shows another exemplary event importance degree conversion table used in the second embodiment. FIG. 16 shows still another event importance degree conversion table used in the second embodiment.

The content extracting system 20 according to the present embodiment mainly includes a content extracting device 100b, the intimacy degree storing unit 11, the person storing unit 13, the content storing unit 15, an event storing unit 17, an event importance degree storing unit 19, the SNS information database 50, an event calculating unit 400 and an event importance degree calculating unit 500.

The intimacy degree storing unit 11, the person storing unit 13 and the content storing unit 15 have been described for the first embodiment, and an explanation thereof will be omitted herein. Though not shown, the person information stored in the person storing unit 13 may be generated by the image analyzing unit 300 described for the first embodiment. The intimacy degree information stored in the intimacy degree storing unit 11 may be generated by the intimacy degree calculating unit 200 described for the first embodiment.

The functions of the content extracting device 100b, the intimacy degree storing unit 11, the person storing unit 13, the content storing unit 15, the event storing unit 17, the event importance degree storing unit 19, the SNS information database 50, the event calculating unit 400 and the event importance degree calculating unit 500 may be mounted on any hardware as long as information can be exchanged via a network. A processing implemented by one function unit may be achieved by one hardware or may be achieved by multiple hardware in a distributed manner.

Generation of event information and an event importance degree used for extracting a content by the content extracting device 100b will be described first. Event information generated by the event calculating unit 400 from the content information stored in the content storing unit 15 will be described first.

The event calculating unit 400 has a function of classifying contents by event based on information on creation time/date of the contents stored in the content storing unit 15. The event calculating unit 400 may classify contents by using a clustering technique, for example. The event calculating unit 400 may extract a person contained in a content as an event's participant. The event calculating unit 400 may store the generated event information in the event storing unit 17.

The event storing unit 17 may be a database using RDB (relational database), for example. Alternatively, the event storing unit 17 may be a file system. For example, FIG. 11 shows exemplary event information stored in the event storing unit 17. The event information may include information such as event ID, event start time/date and end time/date, contents included in an event, and event participants.

The event importance degree will be described below. The event importance degree calculating unit 500 may calculate an importance degree for each person in an event based on the event information stored in the event storing unit 17, the intimacy degree information stored in the intimacy degree storing unit 11 and the SNS information stored in the SNS information database 50. The event importance degree calculating unit 500 may store the calculated event importance degree in the event importance degree storing unit 19.

The event importance degree storing unit 19 may be a database using RDB, for example. Alternatively, the event importance degree storing unit 19 may be a file system. FIG. 12 shows an exemplary event importance degree stored in the event importance degree storing unit 19. For example, the event importance degree information may include event ID, event participants, and event importance for participants. Herein, a larger number of the importance degree indicates a more important event for the person. The event importance degree information is assumed as being stored as separate information from the event information in FIG. 12, but the event importance degree may be managed as part of the event information.

An exemplary event importance degree calculation will be described herein with reference to FIGS. 13 to 16. The event importance degree indicates an importance degree for each person. Thus, the event importance degree is calculated per person. A calculation of the importance degree of Event001 for the person ID001 will be described herein, for example.

For example, the event importance degree calculating unit 500 may use the event information stored in the event storing unit 17 to calculate importance degree 1 based on at least one of the number of contents included in an event, a length and a frequency. Many photographs may be taken at important events such as wedding ceremony and athletic festival. When a content is an animation, the animation may be taken for a longer time at an important event. An important event may be considered as less frequent. The event importance degree calculating unit 500 may increase the value of the importance degree 1 as the number of contents is more, the length of a content is longer or the frequency of an event is lower.

The event importance degree calculating unit 500 may calculate importance degree 2 based on the event information stored in the event storing unit 17 and the location and time/date of the held event. At this time, the event importance degree calculating unit 500 may convert the location and time/date of the held event into an importance degree with reference to the importance degree conversion table 23. For example, FIGS. 14 and 15 show an exemplary importance degree conversion table 23 used at this time. FIG. 14 shows the importance degree conversion table 23 for converting an event time/date into an importance degree. FIG. 15 shows the importance degree conversion table 23 for converting an event location into an importance degree.

The event importance degree calculating unit 500 may calculate importance degree 3 of the event based on the person information stored in the person storing unit 13. At this time, the event importance degree calculating unit 500 may obtain an intimacy degree of the person ID001 and the other participant ID002 from the person information based on the information on the participants of Event001. The event importance degree calculating unit 500 may obtain information on a smile degree of participants in a content included in Event001 from the person information. The event importance degree calculating unit 500 may calculate importance degree 3 based on the obtained intimacy degree and smile degree. It may be considered that the importance degree of the event is higher as an intimacy degree between event participants is higher or a smile degree of event participants is higher. Thus, the event importance degree calculating unit 500 may increase the value of the importance degree 3 as the intimacy degree between event participants is higher or the smile degree of event participants is higher.

The event importance degree calculating unit 500 may calculate importance degree 4 based on the participant information by using the SNS information obtained from the SNS information database 50. For example, when a participant has posted a text on Event001 or has communicated via e-mail on SNS, Event001 may be considered as an important event for the participant. Thus, the event importance degree calculating unit 500 may increase the value of importance degree 4 as the participant makes more communication about Event001 within SNS.

When the user has created an album of Event001 on SNS, the event importance degree calculating unit 500 may calculate importance degree 5 by using information on the album title. At this time, the event importance degree calculating unit 500 may convert a word extracted from the album title into an importance degree by using the importance degree conversion table 23. FIG. 16 shows an exemplary importance degree conversion table used herein.

The event importance degree calculating unit 500 may calculate an importance degree of the event by adding the normalized importance degree 1 to importance degree 5. The event importance degree calculating unit 500 may weight and add the values of the importance degree 1 to importance degree 5.

The generation of the event information and the event importance degree used in the present embodiment has been described above. The event information generating method and the event importance degree calculating method described herein are exemplary and the present technique is not limited thereto. The event information and the event importance degree information may be generated by other various methods. Turning to FIG. 13 again, the structure of the content extracting system 20 will be described further.

The content extracting device 100b is an exemplary information processing device having a function of extracting a content in association with a viewer from a plurality of contents. The extracted content may be an image content including a still image and animation, for example. The content extracting device 100b may transmit the extracted content to a user terminal device, thereby providing the content thereto. Alternatively, the content extracting device 100b may update access restriction information on the extracted content and publish the extracted content to the designated user thereby to provide the content so that the user may view the extracted content.

The content extracting device 100b mainly includes the extraction condition obtaining unit 105, the intimacy degree information obtaining unit 110, the extraction period specifying unit 115, an importance degree obtaining unit 117, a content extracting unit 120b and the content reproducing unit 125.

The extraction condition obtaining unit 105 has a function of obtaining a condition for extracting a content. The extraction condition may include a person ID of a designated user, for example. The extraction condition may include the number of extracted contents. For example, the designated user may be input via an operation screen. For example, the extraction condition obtaining unit 105 may display a person included in a user's content with a thumbnail image or name, and provide a selection screen for selecting a person. The extraction condition obtaining unit 105 may assume the person ID of a person selected on the selection screen as a person ID of a user designated as content-viewing user. The designated user may be specified by analyzing the image. For example, a person viewing the screen on which the extracted content is being provided analyzes the shown image and specifies a user, and may assume the specified user as a designated user. The extraction condition obtaining unit 105 may supply the obtained extraction condition to the intimacy degree information obtaining unit 110.

The intimacy degree information obtaining unit 110 has a function of obtaining intimacy degree information of the designated user based on the person ID of the designated user included in the content extraction condition obtained by the extraction condition obtaining unit 105. The intimacy degree information obtaining unit 110 may supply the obtained intimacy degree information to the extraction period specifying unit 115. The intimacy degree information obtained herein may be calculated based on the analysis result of multiple contents as stated above. The intimacy degree information may be calculated based on the SNS registration information of the designated user. The intimacy degree information may be calculated based on information on the SNS usage history of the designated user. At this time, the information on the SNS usage history may be the number of contacts made between designated users on SNS.

The extraction period specifying unit 115 has a function of specifying an extraction period based on the intimacy degree information supplied from the intimacy degree information obtaining unit 110. The extraction period specifying unit 115 may assume a period in which the intimacy degree between designated users is high as an extraction period. The extraction period specifying unit 115 may supply the information on the specified extraction period and the intimacy degree information supplied from the intimacy degree information obtaining unit 110 to the importance degree obtaining unit 117.

The importance degree obtaining unit 117 has a function of obtaining importance degree information on an event held in the extraction period specified by the extraction period specifying unit 115. For example, in the present embodiment, the start time/date and the end time/date of the event information is compared with the extraction period, and thus a decision is made as to whether each event is held in the extraction period, thereby extracting the event. The importance degree obtaining unit 117 may extract the importance degree of the extracted event from the event importance degree storing unit 19. The importance degree obtaining unit 117 may extract the event when the event-held period is included in the extraction period. Alternatively, the importance degree obtaining unit 117 may extract the event when the event-held period partially overlaps the extraction period.

The content extracting unit 120b has a function of extracting a content in the extraction period specified by the extraction period specifying unit 115. Thus, the content extracting unit 120b may extract a content in a period in which an intimacy degree between designated users is high. The content extracting unit 120b may specify a third party who has commonly high intimacy degree among the designated users from the supplied intimacy degree information, and may preferentially extract a content including the third party. With the structure, there is extracted the content which is in the period in which the intimacy degree between the designated users is high and which includes a person who has commonly high intimacy degree among the designated users. Therefore, a content in which a content-viewer is more interested is automatically extracted. The content extracting unit 120b may specify an event having a high importance degree which is common between a designated user and a third party having a high intimacy degree with the designated user, based on the event importance degree information obtained by the importance degree obtaining unit 117. The content extracting unit 120b may extract a content included in the event decided based on the importance degree. The content extracting unit 120b may extract and output the extracted content, for example. Alternatively, the content extracting unit 120b may output a list of extracted contents, for example.

The content reproducing unit 125 may reproduce the content extracted by the content extracting unit 120b based on the intimacy degree information of the designated user. For example, the content reproducing unit 125 may use an effect based on the intimacy degree information of the designated user to reproduce the content. For example, the content reproducing unit 125 may reproduce the content by panning or zooming the person having a high intimacy degree. For example, when a group photograph is reproduced, the photograph is preferably reproduced while being subjected to the effect such that the faces of a designated user and a person having a high intimacy degree with the designated user are apparently shown. The content reproducing unit 125 is described as part of the content extracting device 100b but the present technique is not limited thereto. For example, the content reproducing unit 125 may be separate from the content extracting device 100b.

The exemplary functions of the content extracting device 100b, the event calculating unit 400 and the event importance degree calculating unit 500 according to the present embodiment have been described above. Each component described above may be configured with a general-purpose member or circuit and may be configured in hardware specific to the function of each component. The function of each component may be implemented by reading a control program from a storage medium such as read only memory (ROM) or random access memory (RAM) which stores therein the control program describing a processing procedure of a computing device such as central processing unit (CPU) for realizing the function, and interpreting and executing the program. Thus, the structure to be utilized may be changed as necessary depending on a technical level at which the present embodiment is to be performed.

It is possible to create a computer program for realizing the functions of the content extracting device 100b, the event calculating unit 400 and the event importance degree calculating unit 500 according to the present embodiment as described above and to mount it on a personal computer or the like. It is further possible to provide a computer-readable recording medium storing the computer program therein. The recording medium is a magnetic disc, optical disc, magnetooptical disc, flash memory or the like, for example. The computer program may be distributed via a network, for example, not via a recording medium.

2-2. Exemplary Content Extracting Operation

Figure 17:
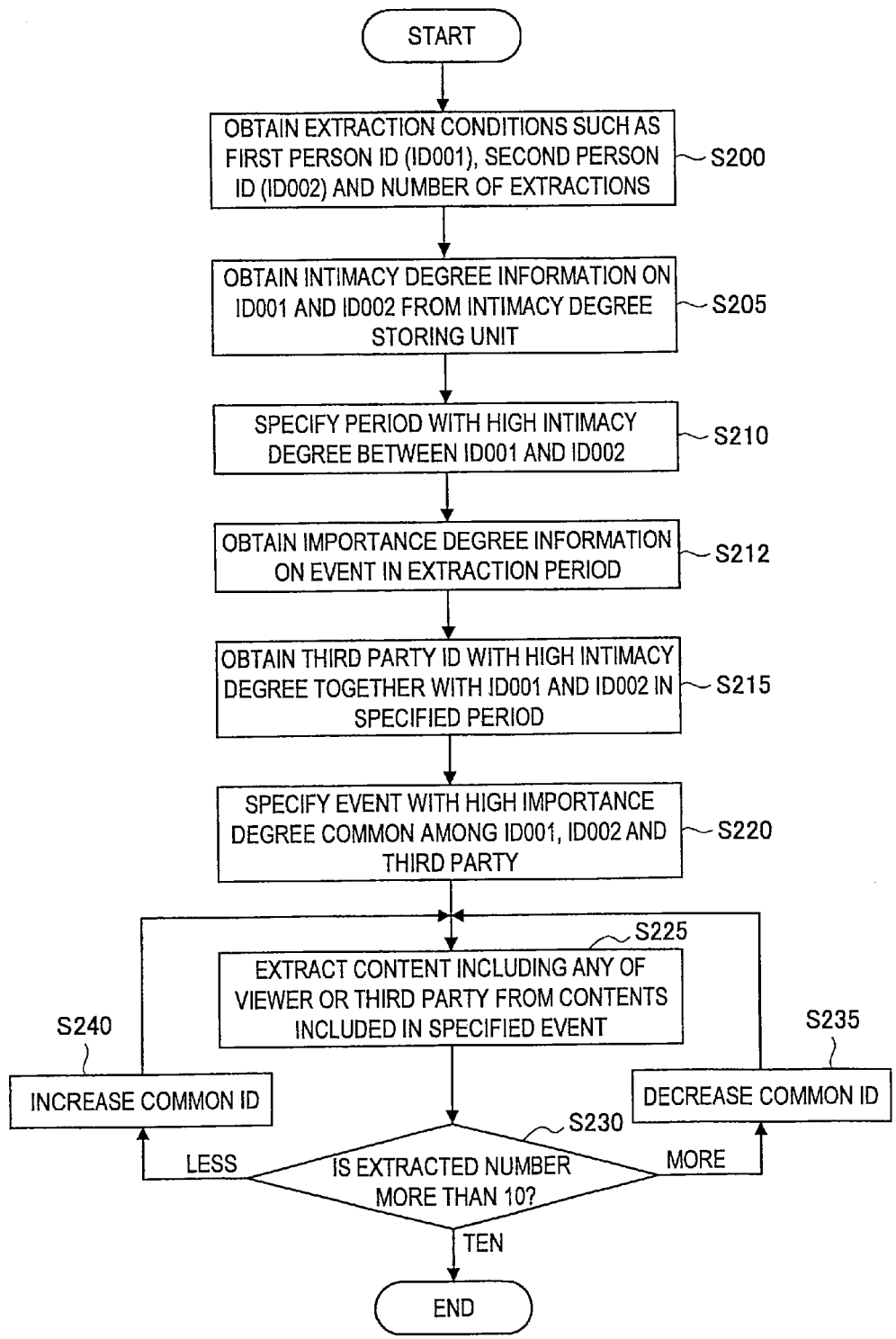
FIG. 17 is a flowchart showing an exemplary content extracting operation according to the second embodiment.

An exemplary content extracting operation according to a second embodiment of the present disclosure will be described below with reference to FIG. 17. FIG. 17 is a flowchart showing an exemplary content extracting operation according to the second embodiment.

In the content extracting device 100b, the extraction condition obtaining unit 105 first obtains an extraction condition (S200). The extraction condition may contain person IDs of designated users and the number of extractions. In the present embodiment, the user IDs of the designated persons are ID001 and ID002.

The intimacy degree information obtaining unit 110 then obtains intimacy degree information of the person ID001 and the person ID002 from the intimacy degree storing unit 11 (S205). The extraction period specifying unit 115 specifies a period in which the intimacy degree between the person ID001 and the person ID002 is high as an extraction period (S210). The importance degree obtaining unit 117 then obtains importance degree information of an event in the specified extraction period (S212).

The content extracting unit 120b obtains a person ID of a third party commonly having a high intimacy degree with the person ID001 and the person ID002 in the specified extraction period (S215). The content extracting unit 120b then specifies an event having a high importance degree which is common among the person ID001, the person ID002 and the third party (S220). The content extracting unit 120b specifies a content including any of the designated user or the third party from the contents included in the specified event (S225).

The content extracting unit 120b counts the number of extracted contents and compares the number of extracted contents with the designated number of extractions of 10 (S230). Then, when the number of extracted contents reaches 10, the processing terminates.

On the other hand, when the number of extracted contents is more than the number of extractions, the content extracting unit 120b decreases the common IDs of the third parties who have commonly high intimacy degree among the designated users (S235). For example, the content extracting unit 120b may decrease the common IDs by deleting the third parties' IDs having the lowest intimacy degree among the extracted third parties from the common IDs.

When the number of extracted contents is less than the number of extractions, the content extracting unit 120b increase the common IDs of the third parties who have commonly high intimacy degree among the designated users (S240). For example, the content extracting unit 120b may increase the common IDs by lowering a threshold of the intimacy degree used for extracting a third party.

As described above, a content in a period in which an intimacy degree between designated users is high is extracted thereby to efficiently extract a content in which the designated users are interested, thereby enhancing a satisfaction level of the user viewing the content. At this time, a content including the third party who has commonly high intimacy degree among designated users may be preferentially extracted. With the structure, when a user designates himself and his friend on the operation screen, for example, a content including a friend who is common between the user and his designated friend and has a high intimacy degree is preferentially extracted. When the user designates himself and his parent on the operation screen, a content including a person who has commonly high intimacy degree between the user and his parent, such as a family member is preferentially extracted.

A image in which a person viewing the screen on which the extracted content is being provided is analyzed and a user is specified, and the content with the specified user as a designated user may be extracted. With the structure, even when the user does not apparently designate a person, the user viewing the screen may be automatically recognized and a content having a high importance degree for the recognized user may be extracted.

Additionally, the present technology may also be configured as below.

(1) An information processing apparatus comprising:
a processor that:
obtains intimacy degree information corresponding to identification information of a first person;
specifies an extraction period based on the intimacy degree information; and
extracts content in the extraction period.

(2) The information processing apparatus of (1), wherein the intimacy degree information indicates a degree of intimacy between the first person and a second person.

(3) The information processing apparatus of (1) or (2), wherein the intimacy degree information indicates a degree of intimacy between the first person and a second person over a predetermined period of time.

(4) The information processing apparatus of any one of (1) to (3), wherein the intimacy degree information indicates a degree of intimacy between the first person and a second person and is calculated based on stored image data corresponding to the first person and the second person.

(5) The information processing apparatus of any one of (1) to (4), wherein the intimacy degree information indicates a degree of intimacy between the first person and a second person and is calculated based on a frequency of contact between the first person and the second person.

(6) The information processing apparatus of any one of (1) to (5), wherein the intimacy degree information indicates a degree of intimacy between the first person and a second person, and the processor specifies the extraction period as a period during which the degree information indicates that a degree of intimacy between the first person and the second person is high.

(7) The information processing apparatus of (6), wherein the processor identifies a third person having a high degree of intimacy with the first person and the second person during the specified extraction period.

(8) The information processing apparatus of (7), wherein the processor extracts content corresponding to the first, second an third persons during the specified extraction period.

(9) The information processing apparatus of (6) or (7), wherein processor identifies an event during the extraction period and obtains importance degree information corresponding to the event.

(10) The information processing apparatus of (9), wherein the processor extracts the content in the extraction period based on the importance degree information corresponding to the event.

(11) The information processing apparatus of (9) or (10), wherein the processor identifies a third person having a high degree of intimacy with the first person and the second person during the specified extraction period.

(12) The information processing apparatus of (11), wherein the processor extracts the content in the extraction period corresponding to the first, second and third person based on the importance degree information corresponding to the event.

(13) The information processing apparatus of any one of (9) to (11), wherein the importance degree information corresponding to the event is calculated based on at least one of a date of the event, a time of the event, a location of the event, and an analysis of content associated with the event.

(14) The information processing apparatus of any one of (1) to (6), wherein the intimacy degree information is calculated based on contents and registration information in a social network service.

(15) The information processing apparatus of any one of (1) to (6), or (14), wherein the intimacy degree information is calculated based on information corresponding to a usage history of a social network service.

(16) The information processing apparatus of (15), wherein the intimacy degree information indicates a degree of intimacy between the first person and a second person and the information corresponding to a usage history of a social network service indicates a frequency of contact between the first person and the second person.

(17) The information processing apparatus of any one of (1) to (6), (14) or (15), wherein the processor obtains captured image data and identifies the first person based on the obtained captured image data.

(18) An information processing method performed by an information processing apparatus, the method comprising:
obtaining, by a processor of the information processing apparatus, intimacy degree information corresponding to identification information of a person;
specifying, by the processor, an extraction period based on the intimacy degree information; and extracting, by the processor, content in the extraction period.

(19) A non-transitory computer-readable medium including computer program code, which when executed by an information processing apparatus, causes the information processing apparatus to perform a method comprising:
obtaining intimacy degree information corresponding to identification information of a person;
specifying an extraction period based on the intimacy degree information; and
extracting content in the extraction period.

Furthermore, the present technology may also be configured as below.

(1) An information processing apparatus comprising: a processor that: obtains intimacy degree information corresponding to identification information of a first person; specifies an extraction period based on the intimacy degree information; and extracts content in the extraction period.

(2) The information processing apparatus of (1), wherein the intimacy degree information indicates a degree of intimacy between the first person and a second person.

(3) The information processing apparatus of (1) or (2), wherein the intimacy degree information indicates a degree of intimacy between the first person and a second person over a predetermined period of time.

(4) The information processing apparatus of any one of (1) to (3), wherein the intimacy degree information indicates a degree of intimacy between the first person and a second person and is calculated based on stored image data corresponding to the first person and the second person.

(5) The information processing apparatus of any one of (1) to (4), wherein the intimacy degree information indicates a degree of intimacy between the first person and a second person and is calculated based on a frequency of contact between the first person and the second person.

(6) The information processing apparatus of any one of (1) to (5), wherein the intimacy degree information indicates a degree of intimacy between the first person and a second person, and the processor specifies the extraction period as a period during which the degree information indicates that a degree of intimacy between the first person and the second person is high.

(7) The information processing apparatus of (6), wherein the processor identifies a third person having a high degree of intimacy with the first person and the second person during the specified extraction period.

(8) The information processing apparatus of (7), wherein the processor extracts content corresponding to the first, second an third persons during the specified extraction period.

(9) The information processing apparatus of any one of (6) to (8), wherein processor identifies an event during the extraction period and obtains importance degree information corresponding to the event.

(10) The information processing apparatus of (9), wherein the processor extracts the content in the extraction period based on the importance degree information corresponding to the event.

(11) The information processing apparatus of (9) or (10), wherein the processor identifies a third person having a high degree of intimacy with the first person and the second person during the specified extraction period.

(12) The information processing apparatus of (11), wherein the processor extracts the content in the extraction period corresponding to the first, second and third person based on the importance degree information corresponding to the event.

(13) The information processing apparatus of any one of (9) to (12), wherein the importance degree information corresponding to the event is calculated based on at least one of a date of the event, a time of the event, a location of the event, and an analysis of content associated with the event.

(14) The information processing apparatus of any one of (1) to (13), wherein the intimacy degree information is calculated based on contents and registration information in a social network service.

(15) The information processing apparatus of any one of (1) to (14), wherein the intimacy degree information is calculated based on information corresponding to a usage history of a social network service.

(16) The information processing apparatus of claim (15), wherein the intimacy degree information indicates a degree of intimacy between the first person and a second person and the information corresponding to a usage history of a social network service indicates a frequency of contact between the first person and the second person.

(17) The information processing apparatus of any one of (1) to (15), wherein the processor obtains captured image data and identifies the first person based on the obtained captured image data.

(18) An information processing method performed by an information processing apparatus, the method comprising: obtaining, by a processor of the information processing apparatus, intimacy degree information corresponding to identification information of a person; specifying, by the processor, an extraction period based on the intimacy degree information; and extracting, by the processor, content in the extraction period.

(19) A non-transitory computer-readable medium including computer program code, which when executed by an information processing apparatus, causes the information processing apparatus to perform a method comprising: obtaining intimacy degree information corresponding to identification information of a person; specifying an extraction period based on the intimacy degree information; and extracting content in the extraction period.

It should be understood by those skilled in the art that various modifications, combinations, sub-combinations and alterations may occur depending on design requirements and other factors insofar as they are within the scope of the appended claims or the equivalents thereof.

In the present specification, the steps described in the flowchart include the processing time-sequentially performed in the described order and the processings performed in parallel or individually though not being time-sequentially processed. The time-sequentially processed steps may change the order as necessary, of course. The present disclosure contains subject matter related to that disclosed in Japanese Priority Patent Application JP 2011-131129 filed in the Japan Patent Office on Jun. 13, 2011, the entire content of which is hereby incorporated by reference.

What is claimed is:

1. An information processing system comprising:
circuitry configured to
obtain intimacy degree information indicating a degree of intimacy between a first person and a second person, wherein the intimacy degree information indicates a degree of intimacy between the first person and a second person over a period of time and is determined based on at least one image including the first person and the second person and information corresponding to the first person and the second person obtained from social media; and
update the intimacy degree information based on an operation corresponding to at least one of the first person and the second person in the social media.

2. The information processing system of claim 1, wherein the intimacy degree information is calculated based on a plurality of stored images including the first person and the second person.

3. The information processing system of claim 1, wherein the circuitry is configured to specify an extraction period based on the intimacy degree information.

4. The information processing system of claim 3, wherein the circuitry is configured to extract content in the extraction period.

5. The information processing system of claim 3, wherein the circuitry is configured to specify the extraction period as a period during which the intimacy degree information indicates that a degree of intimacy between the first person and the second person is high.

6. The information processing apparatus of claim 1, wherein the circuitry is configured to identify a third person having a high degree of intimacy with the first person and the second person.

7. The information processing system of claim 6, wherein the circuitry is configured to:
specify an extraction period based on the intimacy degree information; and
extract content corresponding to at least one of the first, second and third persons during the specified extraction period.

8. The information processing system of claim 1, wherein the circuitry is configured to:
identify an event corresponding the first person and the second person; and
obtain importance degree information corresponding to the event.

9. The information processing system of claim 8, wherein the circuitry is configured to extract content corresponding to at least one of the first person and the second person based on the importance degree information corresponding to the event.

10. The information processing system of claim 8, wherein the circuitry is configured to identify a third person having a high degree of intimacy with the first person and the second person.

11. The information processing system of claim 10, wherein the circuitry is configured to extract content corresponding to at least one of the first, second and third person based on the importance degree information corresponding to the event.

12. The information processing system of claim 8, wherein the importance degree information corresponding to the event is calculated based on at least one of a date of the event, a time of the event, a location of the event, and an analysis of content associated with the event.

13. The information processing system of claim 1, wherein the intimacy degree information is calculated based on contents and registration information in a social media service.

14. The information processing system of claim 1, wherein the intimacy degree information is calculated based on information corresponding to a usage history of a social media service.

15. The information processing system of claim 14, wherein
the intimacy degree information indicates a degree of intimacy between the first person and the second person and the information corresponding to a usage history of a social media service indicates a frequency of contact between the first person and the second person.

16. The information processing apparatus of claim 1, wherein the circuitry is configured to:
obtain captured image data; and
identify the first person based on the obtained captured image data.

17. An information processing method performed by an information processing apparatus, the method comprising:
obtaining, by circuitry of the information processing apparatus, intimacy degree information indicating a degree of intimacy between a first person and a second person, wherein the intimacy degree information indicates a degree of intimacy between the first person and a second person over a period of time and is determined based on at least one image including the first person and the second person and information corresponding to the first person and the second person obtained from social media; and
updating the intimacy degree information based on an operation corresponding to at least one of the first person and the second person in the social media.

18. A non-transitory computer-readable medium including computer program code, which when executed by an information processing apparatus, causes the information processing apparatus to:
obtain intimacy degree information indicating a degree of intimacy between a first person and a second person, wherein the intimacy degree information indicates a degree of intimacy between the first person and a second person over a period of time and is determined based on at least one image including the first person and the second person and information corresponding to the first person and the second person obtained from social media; and
update the intimacy degree information based on an operation corresponding to at least one of the first person and the second person in the social media.

* * * * *